US006839434B1

(12) United States Patent
Mizikovsky (10) Patent No.: US 6,839,434 B1
(45) Date of Patent: Jan. 4, 2005

(54) METHOD AND APPARATUS FOR PERFORMING A KEY UPDATE USING BIDIRECTIONAL VALIDATION

(75) Inventor: Semyon B. Mizikovsky, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/362,455

(22) Filed: Jul. 28, 1999

(51) Int. Cl.[7] .............................................. H04K 1/00
(52) U.S. Cl. ...................... 380/247; 713/179; 705/56
(58) Field of Search ....................... 380/247; 713/179; 705/56

(56) References Cited

U.S. PATENT DOCUMENTS 5,153,919 A * 10/1992 Reeds et al. ................ 380/44
5,606,615 A * 2/1997 Lapointe et al. ............ 713/185

FOREIGN PATENT DOCUMENTS

| EP | 0 506 637 A | 9/1992 | ............ H04Q/9/32 |
| EP | 0 532 231 A | 3/1993 | ............ H04L/9/32 |
| EP | 1 001 570 A | 5/2000 | ............ H04L/9/32 |
| WO | WO 98 31161 A | 7/1998 | ............ H04Q/7/00 |

OTHER PUBLICATIONS

TIA/EIA: "Cellular Radiotelecommunications Intersystem Operations" TIA/EIA–41.3 D, vol. 41.3D, Dec. 1997, pp. 3.1–3.416, XP002194319, Chapter 3, p. 3.193–p. 3.195.

European Search Report dated May 2, 2002.

* cited by examiner

Primary Examiner—Gregory Morse
Assistant Examiner—Christopher J. Brown
(74) Attorney, Agent, or Firm—Julio A. Garceran (57) ABSTRACT

A key update system uses information in an update message from a communications system to generate a new key and perform a bidirectional validation of the new key. After a unit validates the new key, at least a portion of information from the update message is used by the communications system to validate the new key. As a result, the communications system is not required to generate and transmit a separate authentication challenge to validate the new key. For example, a wireless communications system can send an update message with a sequence RANDSSD to the wireless unit. The wireless unit generates a new SSD using at least a portion of the sequence RANDSSD, and the wireless unit uses at least a portion of the new SSD to generate a signature value AUTHBS to validate the new key and thereby the home authentication center that initiated the update of the SSD. After the wireless unit validates the new key by comparing the AUTHBS generated by the wireless unit with an AUTHBS generated by the wireless communications system, the wireless unit uses at least a portion of the sequence RANDSSD and at least a portion of the new SSD to generate the validation value AUTHSSD. The validation value AUTHSSD can be sent to the wireless communications system along with a confirmation signal indicating the wireless unit has validated the new key. The wireless communications system can validate the new SSD by comparing the validation value AUTHSSD received from the wireless unit with a validation value generated in the same fashion by the wireless communications system.

21 Claims, 4 Drawing Sheets

METHOD AND APPARATUS FOR PERFORMING A KEY UPDATE USING BIDIRECTIONAL VALIDATION

BACKGROUND OF THE INVENTION

1. Field of the Invention

The present invention relates to communications; more specifically, the updating of keys or other information used by communicating parties.

2. Description of Related Art

A typical wireless communications system provides wireless communications services to a geographic region. When a wireless unit attempts communications with the wireless communications system, the wireless communications system authenticates or verifies the wireless unit's identity before allowing the wireless unit access to the wireless communication system. To do so in a typical wireless communications system, both the wireless unit and the wireless communications system have a secret value called A-KEY. The wireless communications system uses the A-KEY and a randomly generated sequence RANDSSD to generate a shared secret data value (SSD). The SSD can be divided into SSD-A (Shared Secret Data A) and SSD-B (Shared Secret Data B) values. The SSD-A value is used for authentication procedures, and the SSD-B value is used for key generation and encryption procedures. The wireless communications system transmits the RANDSSD to the wireless unit. The wireless unit then calculates SSD in the same fashion as calculated by the wireless communications system.

Before accepting new SSD values to be used in authentication and encryption procedures, the wireless unit validates the new SSD values. To do so, the wireless unit generates a random challenge RANDBS to generates a validation signature value AUTHBS. The wireless unit also sends the RANDBS to the wireless communications system, and the wireless communications system derives AUTHBS in the same fashion using RANDBS from the wireless unit. The wireless communications system sends the AUTHBS value to the wireless unit, and the wireless unit compares the AUTHBS value generated at the wireless unit with the AUTHBS value sent from the system. If the comparison is successful, the SSD update is successful.

After the SSD update, the wireless communications system typically authenticates the wireless unit to ensure that the wireless unit has properly calculated the SSD. The wireless communications system generates a sequence, such as a random challenge RANDU, and sends the sequence RANDU to the wireless unit which uses RANDU and SSD-A to generate an authentication signature value AUTHU. The wireless communications system generates the authentication signature value AUTHU in the same fashion. The wireless unit then transmits the value AUTHU calculated by the wireless unit to the wireless communications system. The wireless communications system compares the value AUTHU calculated by the system and the AUTHU value received from the wireless unit. If the values match, the wireless unit is authenticated.

The above-described SSD update and authentication of the wireless unit requires that the wireless unit confirm the validity of the SSD update followed by the system performing a separate authentication of the wireless unit to ensure the validity of the SSD update from the perspective of the wireless unit and the wireless communications system. As a result, the wireless unit confirms that the SSD update is successful before the authentication of the wireless unit can be initiated. After the wireless unit confirms the SSD update, the system performs a separate authentication requiring the system to generate additional information, such as a random challenge RANDU, and to send the random challenge to the wireless unit. The wireless unit must then respond by sending to the system the authentication signature value AUTHU derived using RANDU.

SUMMARY OF THE INVENTION

The present invention provides a key update system which uses information in an update message from a communications system to generate a new key and perform a bidirectional validation of the new key. After a unit validates the new key, at least a portion of information from the update message is used by the communications system to validate the new key. As a result, the communications system is not required to generate and transmit a separate authentication challenge to validate the new key. For example, a wireless communications system can send an update message with a sequence RANDSSD to the wireless unit. The wireless unit generates a new SSD using at least a portion of the sequence RANDSSD, and the wireless unit uses at least a portion of the new SSD to generate a signature value AUTHBS to validate the new key and thereby the home authentication center that initiated the update of the SSD. After the wireless unit validates the new key by comparing the AUTHBS generated by the wireless unit with an AUTHBS generated by the wireless communications system, the wireless unit uses at least a portion of the sequence RANDSSD and at least a portion of the new SSD to generate the validation value AUTHSSD. The validation value AUTHSSD can be sent to the wireless communications system along with a confirmation signal indicating the wireless unit has validated the new key. The wireless communications system can validate the new SSD by comparing the validation value AUTHSSD received from the wireless unit with a validation value generated in the same fashion by the wireless communications system.

BRIEF DESCRIPTION OF THE DRAWINGS

Other aspects and advantages of the present invention may become apparent upon reading the following detailed description and upon reference to the drawings in which.

DETAILED DESCRIPTION

Figure 1:
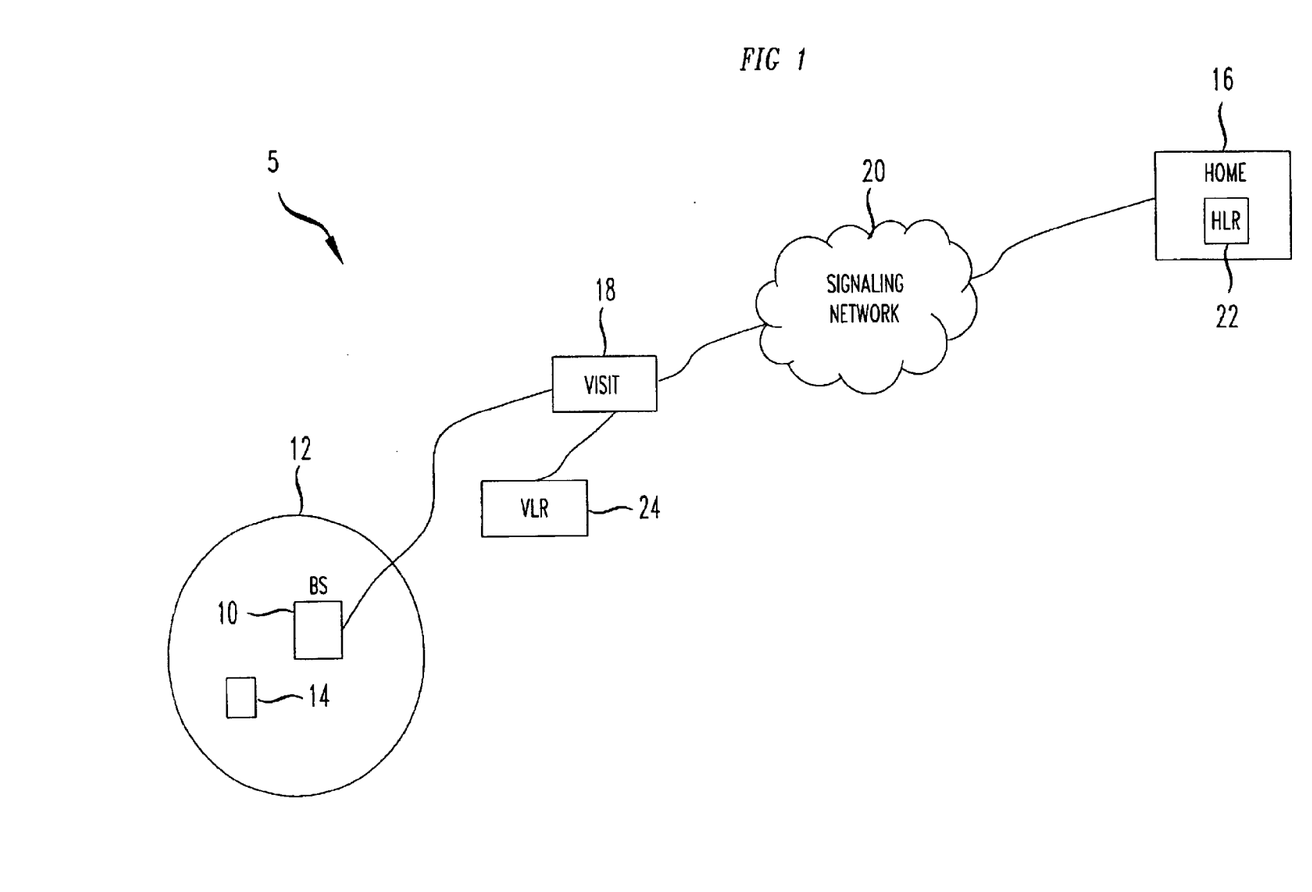
FIG. 1 shows a general diagram of a wireless communications system in which the key update and bidirectional validation system according to the principles of the present invention can be used.

FIG. 1 depicts a portion of a typical wireless communications system 5 which provides wireless communications services through a base station 10 to a geographic region 12, such as a cell or sector, associated with the base station 10. When a wireless unit 14 within the cell 12 first registers or attempts communications with the base station 10, the base station 10 authenticates or verifies the wireless unit's identity before allowing the wireless unit 14 access to the wireless communication system. The home network for the wireless unit 14 can be a collection of cells making up a cellular geographic service area where the wireless unit 14 resides and is typically the network controlled by the service provider that has contracted with the wireless unit's owner to provide wireless communication services. When wireless unit 14 is in a network other than its home network, it is referred to as being in a visiting communication network. If the wireless unit 14 is operating in the visiting communication network, the authentication of the wireless unit by base station 10 will involve communicating with a home authentication center 16 of the wireless unit's home network.

In the example of FIG. 1, the wireless unit 14 is in a visiting communications network. As a result, the authentication of the wireless unit 14 involves communicating with the home authentication center 16 of the wireless unit's home network. When the wireless unit 14 attempts to access the visiting communications network, base station 10 communicates with a visiting authentication center 18 of the visiting communication network. The visiting authentication center 18 determines from a wireless unit or terminal identifier, such as the telephone number of wireless unit 14, that the wireless unit 14 is registered with a network that uses home authentication center 16. Visiting authentication center 18 then communicates with home authentication center 16 over a network, such as a signaling network 20 under the standard identified as TIA/EIA-41-D entitled "Cellular Radiotelecommunications Intersystem Operations," December 1997 ("IS-41"). Home authentication center 16 then accesses a home location register (HLR) 22 which has a registration entry for wireless unit 14. Home location register 22 may be associated with the wireless unit by an identifier such as the wireless unit's telephone number. The information contained in the home location register 22 is used to generate authentication and encryption keys, such as a shared secret data (SSD) key, and other information that is then supplied to a visitor location register (VLR) 24 of the visiting authentication center 18. The information from the visitor location register 24 is then used to supply base station 10 with information, such as a random number challenge, that is transmitted to wireless unit 14 so that wireless unit 14 can respond and thereby be authenticated as a wireless unit that is entitled to receive communication services.

Figure 2A:
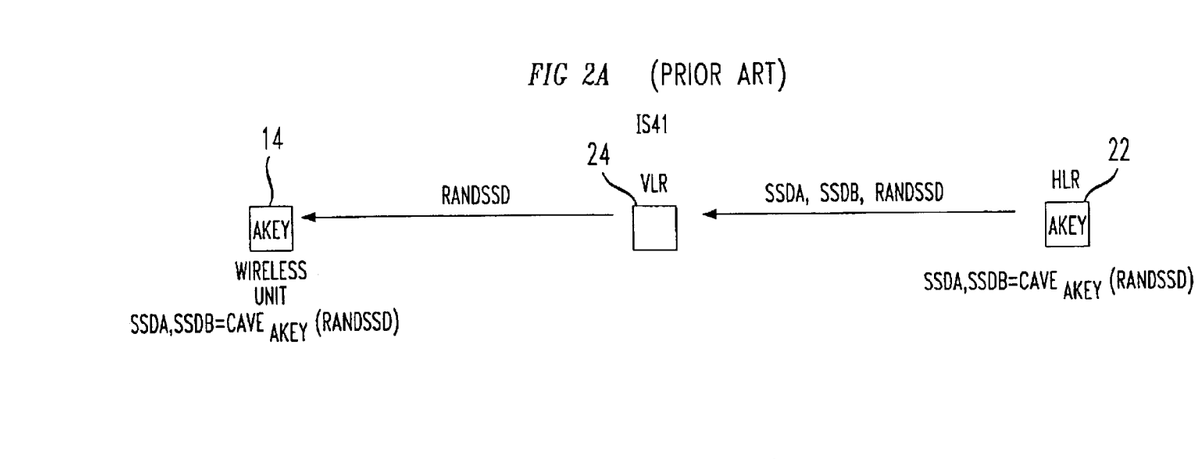
FIGS. 2a and 2b illustrate the sharing of a key with a visitor location register by the home location register and the authentication process in a typical network, such as an IS-41 compliant network.
Figure 2B:
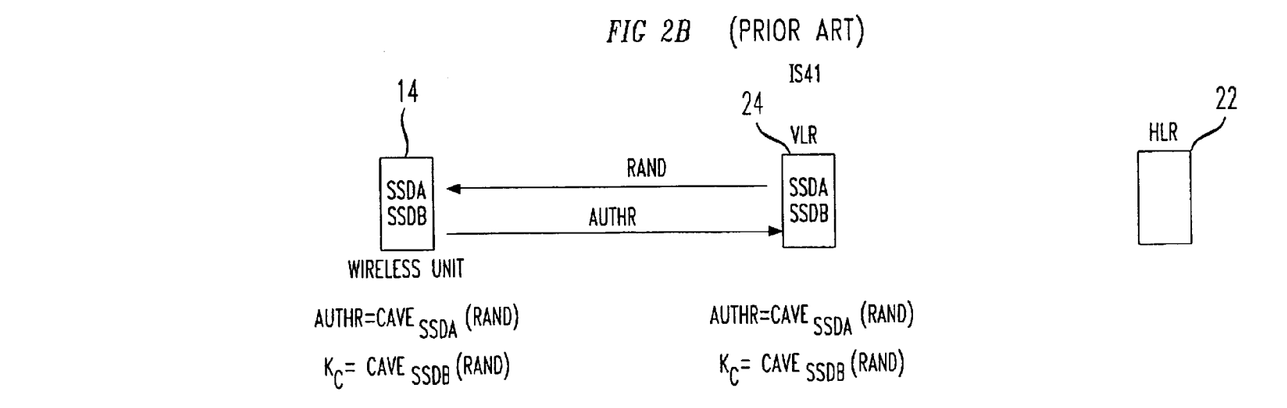

FIGS. 2A and 2B show how a wireless unit 14 is authenticated within a visiting network which is compatible with the IS-41 signaling standard. Both the wireless unit 14 and the home location register 22 contain a secret value called A-KEY. When the wireless unit 14 requests access to a visiting network, the visiting network authentication center 18 (FIG. 1) requests data from the home authentication center 16 (FIG. 1). The home location register 22 associated with the wireless unit 14 is located using an identifier, such as the wireless unit's telephone number. The home location register 22 for the wireless unit 14 stores the A-KEY which is used to generate a shared secret data value (SSD) that will be transmitted to the visitor location register 24. The SSD can be calculated by performing a CAVE algorithm using a random number RANDSSD as an input and the A-KEY as a key input. The CAVE algorithm is well known in the art and is specified in the IS-41 standard. The SSD can be divided into SSD-A (Shared Secret Data A) and SSD-B (Shared Secret Data B) values. The SSD-A value is used for authentication procedures, and the SSD-B value is used for key generation and encryption procedures. The home authentication center 16 transfers the values SSD-A, SSD-B and RANDSSD to the visitor location register 24 of the visiting network. As will be discussed below, the visiting network updates the SSD that will be used by the wireless unit 14 by transmitting RANDSSD to the wireless unit. The wireless unit 14 then calculates SSD in the same fashion as calculated by the home authentication center 16 as shown by the equation SSD-A, SSD-B=$CAVE_{A\text{-}KEY}$(RANDSSD). After both the wireless unit and the visiting location register 24 have the keys SSD-A and SSD-B and the update procedure is completed as described below, the wireless unit 14 can be authenticated by the visiting network.

FIG. 2B illustrates how a wireless unit is authenticated within a visiting network after both the wireless unit and visiting location register have updated the values SSD-A and SSD-B, which can be referred to as shared keys. The visiting authentication center 18 (FIG. 1) challenges the wireless unit 14 by sending a random number challenge RAND to the wireless unit. At this point both the wireless unit and visiting authentication center calculate the value AUTHR where AUTHR is equal to the output of a cryptographic function, such as the CAVE algorithm, using the random number RAND and the SSD-A value as inputs as shown by AUTHR=$CAVE_{SSD\text{-}A}$(RAND). The wireless unit then transmits the calculated value AUTHR to the visiting authentication center 18 (FIG. 1). The visiting authentication center 18 compares its calculated value of AUTHR and the value received from the wireless unit 14. If the values match, the wireless unit 14 is authenticated and it is given access to the visiting network.

In addition, both the wireless unit 14 and the visiting authentication center 18 calculate the value of cipher key $K_C$ where the value $K_C$ is equal to the output of the CAVE algorithm using the value SSD-B as the key input and additional information, such as RAND, as an input as shown by $K_C$=$CAVE_{SSD\text{-}B}$(RAND). At this point, communications between the wireless unit and the visiting network are permitted and may be encrypted using a cryptographic function where the inputs are the message to be encrypted and the key $K_C$. The cryptographic functions are specified for code division multiple access (CDMA), time division multiple access (TDMA) and global system mobile (GSM) systems by their respective standards. It should be noted that with regard to IS-41, communications between the visiting authentication center 18 and the home authentication center 16 are typically carried out each time the wireless unit 14 registers with the visiting network as opposed to each time a call is made to the wireless unit 14. It is also possible to carry out the same procedures when the wireless unit is in the home network. In this case, the home authentication center, rather than the visiting authentication center, communicates with the wireless unit. The communications between the wireless unit and the authentication center in the wireless communications systems pass through a wireless base station.

Figure 3:
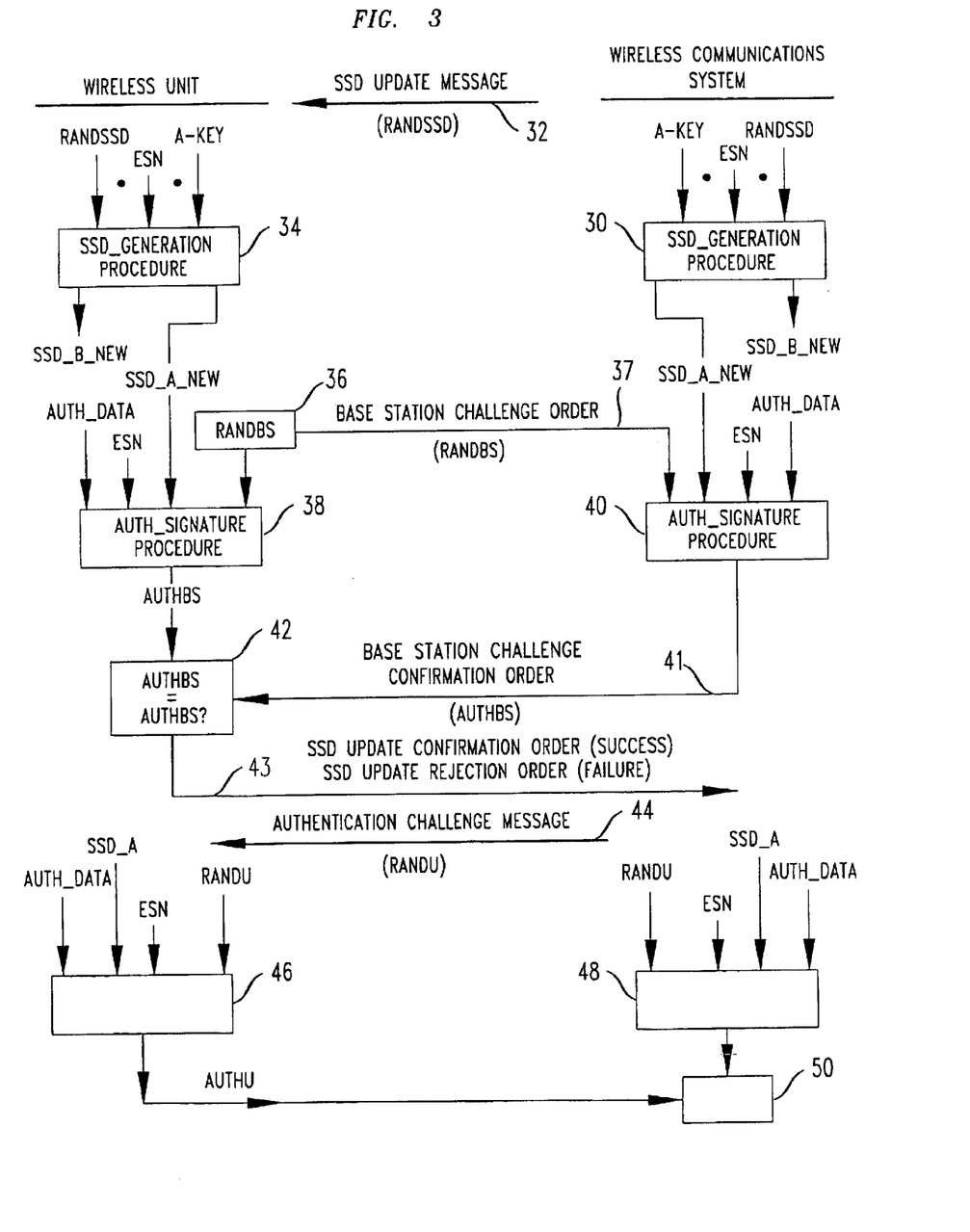
FIG. 3 illustrates a key update and separate authentication procedure used between a wireless unit and a wireless communication system based on IS-95B.

If the home authentication center 16 determines that the key value SSD needs to be updated, for example because certain criteria indicate that the SSD may be compromised, the SSD value associated with the wireless unit 14 can be updated. FIG. 3 shows the SSD update procedure followed by the standard identified as TIA/EIA-95-B entitled "Mobile Station-Base Station Compatibility Standard for Dual-Mode Spread Spectrum Systems" ("IS-95B") between the wireless unit and the wireless communications system. The wireless communications system can include the serving base station, the visiting authentication center, the visitor location register, the home authentication center and/or the home location register. The SSD update procedure provides both the wireless unit and the wireless communications system with updated keys (SSD-A and SSD-B) that will be used for encryption and authentication.

To set the value SSD, the home authentication center creates a RANDSSD sequence. Using the RANDSSD sequence, the A-key and the ESN of the wireless unit as inputs to a cryptographic function, such as a SSD generation procedure 30, the home authentication center generates a new key value (SSD). The home authentication center sends the RANDSSD sequence through the visiting authentication center and the serving base station in an update message, such as an SSD update message 32, to the wireless unit to update the SSD. The wireless unit provides the RANDSSD sequence received from the serving base station along with the A-key and the electronic serial number (ESN), which are stored at the wireless unit, to a cryptographic function, such as an SSD key generation procedure 34. The SSD key generation procedure 34 generates the new SSD which is divided into SSD-A-NEW and SSD-B-NEW. The SSD generation procedures 30 and 34 implement the CAVE algorithm using a random number RANDSSD, ESN and the value A-KEY as inputs. The CAVE algorithm is well known in the art as a one-way function which inhibits the determination of the inputs to the function given the output.

Before accepting new SSD values to be used in authentication and encryption procedures, the wireless unit validates the new SSD value and thereby the home authentication center 16 which initiated the generation of the new SSD value. To do so, the wireless unit generates a random number RANDBS at block 36. The wireless unit provides RANDBS and SSD-A-NEW along with additional data, such as the ESN and/or an AUTH_DATA string derived from an international mobile station identification number (IMSI), to a cryptographic function, such as a signature procedure 38. The signature procedure 38 generates the validation signature value AUTHBS. The wireless unit also sends the RANDBS to the wireless communications system, for example as part of a base station challenge order 37. Using a corresponding cryptographic function, such as a signature procedure 40, the wireless communications system derives AUTHBS using RANDBS from the wireless unit, SSD-A-NEW from the SSD generation procedure 30 and the additional data, such as the ESN and/or the AUTH_DATA, used by the wireless unit to derive AUTHBS. The wireless communications system sends the AUTHBS value generated by the signature procedure 40 to the wireless unit, for example in a base station challenge confirmation order 41. At block 42, the wireless unit compares the AUTHBS value generated at the wireless unit with the AUTHBS value sent from the system. If the comparison is successful, the wireless unit will set the SSD-A value to SSD-A-NEW and the SSD-B value to SSD-B-NEW. The wireless unit then sends an SSD update confirmation order 43 to the home authentication center indicating successful completion of the SSD update. Upon receipt of the SSD update confirmation order, the home authentication center sets SSD-A and SSD-B to the SSD-A-NEW and SSD-B-NEW values generated by the system.

After the SSD update procedure, the wireless communications system typically authenticates the wireless unit to ensure the validity of the new SSD key value. The wireless communications system generates a sequence, such as a random challenge RANDU, and sends the sequence RANDU to the wireless unit, for example in an authentication challenge message 44. Upon receipt of the authentication challenge message 44, the wireless unit provides at least a portion of sequence RANDU to a cryptographic function, for example to an authentication signature procedure 46 with the inputs ESN, AUTH_DATA, SSD-A and a RAND_CHALLENGE derived from RANDU and IMSI. The authentication signature procedure 46 generates the authentication signature value AUTHU as the output of the CAVE algorithm using the RAND_CHALLENGE, ESN, AUTH_DATA and SSD-A as inputs. The wireless communications system generates the authentication signature value AUTHU using the authentication signature procedure 48 in the same fashion. The wireless unit then transmits the value AUTHU calculated by the wireless unit to the wireless communications system. The wireless communications system compares the value AUTHU calculated by the system and the AUTHU value received from the wireless unit at block 50. If the values match, the wireless unit is authenticated, and the wireless communications system validates the new SSD value.

The above-described SSD update and authentication of the wireless unit requires that wireless unit confirm the validity of the SSD update followed by the system performing a separate authentication of the wireless unit to ensure the validity of the SSD update from the perspective of the wireless unit and the wireless communications system. As a result, the wireless unit must transmit the SSD confirmation order to confirm the SSD update before the authentication of the wireless unit can be initiated. After the wireless unit confirms the SSD update, the system performs a separate authentication requiring the system to generate additional information, such as a random challenge RANDU, and to send the random challenge to the wireless unit. The wireless unit must then respond by sending to the system the authentication signature value AUTHU derived using RANDU.

An illustrative embodiment of the key update using bidirectional validation according to the principles of the present invention is described below which provides an improved key update procedure. For example, if a home authentication center initiates a key update, such as a shared secret (SSD) data key, because for example certain criteria at the home authentication center indicate that the key may be compromised or for any other reason (for example, to be initialized), the home authentication center can have an update message sent to the wireless unit. According to the principles of the present invention, the wireless unit uses information (for example, RANDSSD and/or additional information) in the update message and an internally-stored secret value (for example, A-key) known only to the wireless unit and the home authentication center to generate the new or updated key (for example, SSD). After the wireless unit generates the new key value and validates the new key and thereby the home authentication center, a validation of the new key (for example, the SSD) is performed by the wireless communications system using at least a portion of information (for example, RANDSSD and/or other information) sent in the update message. Thus, after performing an SSD update, a separate authentication challenge (for example, RANDU) is not required for the system to validate the new SSD.

Depending on the embodiment and/or whether the wireless unit is registering with a visiting or home network, portions of the key update and bidirectional validation system can be implemented in different portions of the wireless communications system, such as the serving base station, the visiting authentication center, the visitor location register, the home location register and/or the home authentication center. Once the wireless unit has validated the new SSD value and the wireless communications system has validated the new SSD, the wireless unit and the wireless communications system can use the updated keys (SSD-A and SSD-B) for encryption and authentication.

Figure 4:
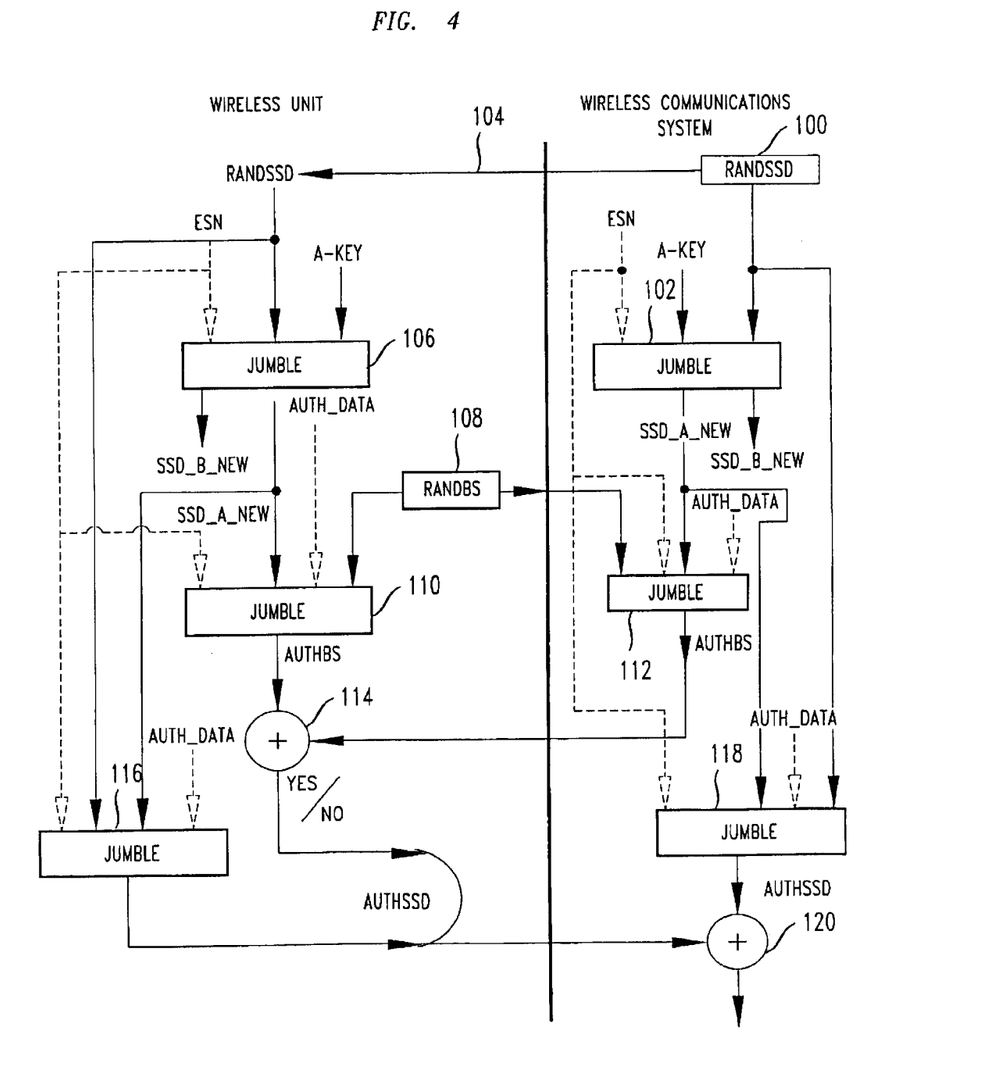
FIG. 4 illustrates a method for performing a key update with bidirectional validation according to the principles of the present invention.

FIG. 4 shows an embodiment of the key update and bidirectional validation procedure between a wireless unit and the wireless communications system. The wireless unit and the home location register share a secret value A-key. When a key update, for example of a shared key (SSD), is to be performed, the home authentication center creates a RANDSSD sequence at block 100. The sequence RANDSSD can be a random number, a pseudo-random number which repeats after a certain period or the output of an ever-increasing counter the received value of which cannot be less than or equal to a previously received value. The home authentication center accesses the home location register associated with the wireless unit using an identifier such as a telephone number of the wireless unit, received from or determined from information received from the wireless unit. The home authentication center then calculates a new key value SSD by taking the output of a cryptographic function, such as an SSD or key generation procedure 102, using the sequence RANDSSD and the secret key A-key as inputs. The new value SSD can be divided into SSD-A-NEW and SSD-B-NEW. After the SSD update is bidirectionally validated, the SSD-A is used in authentication procedures and the SSD-B is used in key generation, for example in generating the cipher key Kc, or encryption procedures. As shown in FIG. 4, embodiments of the key update and bidirectional validation system can use additional input(s) to the key generation procedure 102, for example a value which is characteristic of the wireless unit or the subscription, such as the ESN and/or IMSI.

The wireless communications system sends the RANDSSD sequence to the wireless unit in a SSD update message 104 to create the new SSD value. The wireless unit generates the new value SSD (SSD-A-NEW and SSD-B-NEW) for the key SSD in the same fashion as the wireless communications system using the RANDSSD sequence received from the system, the A-key stored in the wireless unit and any additional information, such as the ESN stored in the wireless unit, as inputs to an SSD generation procedure 106. The SSD generation procedures 102 and 106 implement the CAVE algorithm using a random number RANDSSD, ESN and the value A-KEY as the key input. The CAVE algorithm is well known in the art as a one-way function. Other generation procedures can be used.

After generating the new SSD value (SSD-A-NEW, SSD-B-NEW), the wireless unit authenticates the wireless communications system and thereby validates the new SSD value. To do so, the wireless unit generates a number or sequence RANDBS, such as a random number, at block 108 and sends RANDBS to the wireless communications system. The sequence RANDBS can be a pseudo-random number which repeats after a certain period or the output of an ever-increasing counter the received value of which cannot be less than or equal to a previously received value. The wireless unit provides RANDBS and SSD-A-NEW along with any additional data, such as the ESN and/or an AUTH_DATA string derived from an international mobile station identification number (IMSI), to a signature procedure 110. The signature procedure 110 generates the signature value AUTHBS. On the wireless communications system side, a signature procedure 112 derives AUTHBS using the RANDBS sequence received from the wireless unit, SSD-A-NEW from the SSD generation procedure 102 and any additional data used by the wireless unit, such as ESN and/or AUTH_DATA. The system sends the AUTHBS value generated by the signature procedure 112 to the wireless unit for verification. At block 114, the wireless unit compares the AUTHBS value generated at the wireless unit with the AUTHBS value received from the system. If the comparison is successful, the wireless unit has validated the new SSD value and thereby the wireless communication system, and the wireless unit can set the SSD-A value to SSD-A-NEW and the SSD-B value to SSD-B-NEW.

The wireless communications system then validates the new SSD value. The sequence RANDSSD provided to the wireless unit for updating the key value SSD is also used to validate the new SSD. The wireless unit uses the RANDSSD received from the system and the SSD-A-NEW generated at the wireless unit by the SSD generation procedure 106 along with any additional data, such as at least portions of RANDBS, ESN and/or AUTH_DATA, to provide inputs to a signature procedure 116. For example, at least a portion of RANDSSD and at least a portion of SSD-A-NEW as well as any additional data, such as the ESN and AUTH_DATA, can be provided to the signature procedure 116. The wireless unit then generates a validation value AUTHSSD. The wireless unit sends AUTHSSD to the wireless communications system. On the wireless communications system side, the system provides to a corresponding signature procedure 118 inputs used by the wireless unit to generate AUTHSSD, for example the RANDSSD sequence, the SSD-A-NEW generated by the system using the SSD generation procedure 102 and any additional data used by the wireless unit, such as ESN and AUTH_DATA. The signature procedure 118 generates the validation value AUTHSSD, and the system compares at block 120 the AUTHSSD generated by the system with the AUTHSSD received from the wireless unit. If the comparison is successful, the system validates the updated key SSD, and the system sets the SSD-A value to the SSD-A-NEW value generated by the system and the SSD-B value to the SSD-B-NEW value generated by the wireless communications system.

The key update and bidirectional validation procedure can be carried out: periodically; when the wireless communications system determines that the shared key SSD may be compromised based on certain criteria; when the wireless unit returns to the home network or a trusted visiting network; when the A-key is changed; when a new subscription is established to initialize the SSD value; and/or for other reasons. Additionally, depending on the embodiment, the inputs to the key generation procedures 102 and 106 and the signature procedures 110, 112, 116 and 118 can include values in addition to those mentioned above or inputs derived from those and other values. For example, at least portions of the electronic serial number (ESN) of the wireless unit, the phone number (MIN1) of the wireless unit and/or the IMSI of wireless unit can be used as an input(s) to the key generation and signature procedures 102, 106, 110, 112, 116 and 118. The key generation procedures 102 and. 106 and the signature procedures 110, 112, 116 and 118 can be hash functions or any one-way cryptographic function, such as the CAVE algorithm and/or SHA-1. Hash functions can be characterized as one way functions (a function for which it is not feasible to re-generate the inputs given the output), as functions which produce a many to one mapping of inputs to outputs, and/or as functions which produce outputs with less information than the inputs, thereby the inputs are difficult to ascertain given the output. In such functions, the output is referred to as a signature of the input.

Depending on the embodiment, the communications for the key update and bidirectional validation system can take place between the wireless unit and the home authentication center (through the visiting authentication center if the wireless unit is in a visiting network). In alternative embodiments, portions of the key update and bidirectional validation system can be performed in locations other than the home authentication center. For example, if the home authentication center sends RANDSSD along with the SSD-A-NEW to the visiting authentication center to generate the signature value AUTHBS, the visiting authentication center could generate the AUTHBS sent to the wireless unit, and/or the visiting authentication center could generate AUTHSSD and compare AUTHSSD to the AUTHSSD sent by the wireless unit. Depending on the embodiment, the inputs for the SSD generation and signature procedures can be communicated from different sources to the wireless unit, the visiting authentication center and/or the home authentication center. For example, if the ESN is used as an input to the signature procedure and the visiting authentication center performs the calculation of AUTHBS and AUTHSSD, the ESN could be transmitted to the visiting authentication center from the home authentication center.

In addition to the embodiment(s) described above, the key update and bidirectional validation system according to the principles of the present invention can be used which omit and/or add input parameters to the key generation and signature procedures and/or use variations or portions of the described system. For example, the key update and bidirectional validation system is described with comparative reference to a cellular network using IS-95-B in which a shared key SSD is updated, but other wireless systems using different multiple access techniques, such as TDMA or GSM, can be used in which other information is updated according to the principles of the present invention. It should be understood that different notations, references and characterizations of the various values, inputs and architecture blocks can be used. For example, the functionality of the home authentication center and the visiting authentication center can be performed in mobile switching centers (MSCs) of a wireless communications system. It should be understood that the system and portions thereof and of the described architecture can be implemented in or integrated with processing circuitry in the wireless unit or at different locations of the wireless communications system, or in application specific integrated circuits, software-driven processing circuitry, firmware or other arrangements of discrete components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method of updating a key maintained in a unit for communicating with a communications system, said key is updated by generating a new key as a function of a secret value stored in said unit and at least a portion of a sequence received from said communications system, said new key is validated by generating a signature value as a function of at least a portion of said new key and comparing said signature value with a signature value generated by said communications system, said method comprising the steps of:

generating a validation value as a function of at least a portion of said sequence received from said communications system and at least a portion of said new key; and sending, after said new key is validated by said unit, said validation value to said communication system for said communication system to validate said new key by comparing said validation value with a validation value generated by said communications system.

2. The method of claim 1 wherein said new key is generated by the steps of:

developing an update string comprising at least a portion of said sequence and said secret value; and generating said new key by hashing said string.

3. The method of claim 1 wherein validation of said new key by said unit includes the step of:

generating a challenge sequence.

4. The method of claim 3 wherein said validation includes the steps of:

generating a signature value which is a function of at least said challenge sequence and at least a portion of said new key; and comparing said signature value with a signature value received from said system.

5. The method of claim 1 wherein said step of generating a validation value includes the step of:

developing a validation string comprising at least a portion of said sequence and at least a portion of said new key; and generating said validation value by hashing said validation string.

6. A method of updating a key maintained for a unit in a communications system, said key is updated by generating a new key as a function of a secret value stored in said communications system associated with said unit and at least a portion of an update sequence which is sent to said unit, said communications system generates a signature value as a function of at least a portion of said new key and sends said signature value to said unit for said unit to validate said new key by comparing said signature value with a signature value generated by said unit, said method comprising the steps of:

receiving a first validation value from said unit after said new key is validated by said unit; and comparing said first validation value with a said second validation value generated by said communications system as a function of at least a portion of said update sequence and at least a portion of said new key.

7. The method of claim 6 including the step of:

generating said update sequence.

8. The method of claim 6 including the step of:

receiving by a visiting authentication center said update sequence from a home authentication center.

9. The method of claim 6 further comprising the step of:

generating said new key by hashing at least a portion of said update sequence and a secret value from said update string.

10. The method of claim 6 wherein said sending a signature value includes the steps of:

receiving a challenge sequence;

developing a signature string comprising at least said challenge sequence and at least a portion of said new key;

generating a signature value from said signature string; and sending said signature value to said unit.

11. The method of claim 6 further comprising the step of:

generating said second validation value by hashing at least a portion of said update sequence and at least a portion of said new key.

12. A key update system for enabling a unit to communicate with a communications system, said system adapted to update a key by generating a new key as a function of a secret value stored in said unit and at least a portion of a sequence received from said communications system, said key update system is adapted to validate said new key by generating a signature value as a function of at least a portion of said new key and comparing said signature value with a signature value generated by said communications system, said key update system comprising:

processing circuitry configured to generate a validation value as a function of at least a portion of said sequence received from said communications system and at least a portion of said new key, and to send, after said new key is validated by said unit, said validation value to said communications system for said communications system to validate said new key by comparing said validation value with a validation value generated by said communications system.

13. The system of claim 12 wherein said processing circuitry is further configured to generate said new key by hashing at least a portion of said sequence and said secret value.

14. The system of claim 12 wherein said processing circuitry is further configured to generate a challenge sequence.

15. The system of claim 14 further configured to generate a signature value as a function of at least said challenge sequence and at least a portion of said new key and to compare said signature value with a signature value received from said system.

16. The system of claim 12 further configured to develop a validation string comprising at least a portion of said sequence and at least a portion of said new key and to generate said validation value by hashing said validation string.

17. A system for updating a key maintained for a unit in a communications system, said system adapted to update said key by generating a new key as a function of a secret value stored in said communications system associated with said unit and at least a portion of an update sequence which is sent to said unit, said communications system is adapted to generate a signature value as a function of at least a portion of said new key and to send said signature value to said unit for said unit to validate said new key by comparing said signature value with a signature value generated by said unit, said system comprising:

processing circuitry configured to receive a first validation value from said unit after said new key is validated by said unit, and to compare said first validation value with a second validation value generated by said communications system as a function of at least a portion of said update sequence and at least a portion of said new key.

18. The system of claim 17 wherein said processing circuitry configured to generate said update sequence.

19. The system of claim 17 wherein said processing circuitry further configured to generate said new key by hashing at least a portion of said update sequence and a secret value.

20. The system of claim 17 wherein said processing circuitry further configured to receive a challenge sequence, to generate a signature value as a function of at least said challenge sequence and at least a portion of said new key, and to provide said signature value to said unit.

21. The system of claim 17 wherein said processing circuitry further configured to develop said second validation value by hashing at least a portion of said update sequence and at least a portion of said new key.

* * * * *